United States Patent
Bertrand et al.

(10) Patent No.: US 8,767,653 B2
(45) Date of Patent: *Jul. 1, 2014

(54) RANDOM ACCESS DESIGN FOR HIGH DOPPLER IN WIRELESS NETWORK

(75) Inventors: Pierre Bertrand, Antibes (FR); Tarik Muharemovic, Dallas, TX (US); Jing Jiang, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,104

(22) Filed: Feb. 24, 2012

(65) Prior Publication Data

US 2012/0147821 A1  Jun. 14, 2012

Related U.S. Application Data

(63) Continuation of application No. 11/925,520, filed on Oct. 26, 2007, now Pat. No. 8,199,706.

(60) Provisional application No. 60/863,500, filed on Oct. 30, 2006.

(30) Foreign Application Priority Data

Oct. 27, 2006 (EP) ..................................... 06291687

(51) Int. Cl.
*H04W 4/00* (2009.01)
(52) U.S. Cl.
USPC ......................................................... 370/329
(58) Field of Classification Search
CPC ................................................ H04W 74/0866
See application file for complete search history.

(56) References Cited

U.S. PATENT DOCUMENTS

| 6,535,547 | B1 | 3/2003 | Lyckegard et al. |
| 2004/0170157 | A1 | 9/2004 | Kim et al. |
| 2004/0208253 | A1 | 10/2004 | Joo |
| 2005/0084030 | A1 | 4/2005 | Zhou et al. |
| 2006/0050799 | A1 | 3/2006 | Hou et al. |
| 2006/0056528 | A1 | 3/2006 | Jung et al. |
| 2007/0121538 | A1* | 5/2007 | Ode et al. ...................... 370/323 |
| 2007/0291696 | A1* | 12/2007 | Zhang et al. .................. 370/331 |
| 2010/0034155 | A1 | 2/2010 | Noh et al. |

OTHER PUBLICATIONS

B. M. Popovic, "Generalized Chirp-Like Polyphase Sequences with Optimum Correlation Properties," IEEE Transactions on Information Theory, Jul. 1992.

(Continued)

*Primary Examiner* — Clemence Han
(74) *Attorney, Agent, or Firm* — Mirna Abyad; Frederick J Telecky, Jr.

(57) ABSTRACT

UE-initiated accesses within a cellular network are optimized to account for Doppler shift. A user equipment (UE) receives information that designates a particular access slot as high-speed and designates another access slot as low-speed within a given cell. The UE determines its relative speed to a serving base station (NodeB) within the cell. The UE selects either a baseline structure or an alternate structure if the relative speed is less than a threshold value or only an alternate structure if the relative speed exceeds the threshold value. The UE transmits a signal to the NodeB using the selected structure, such that the baseline structure is transmitted only in the designated low-speed access slot and that the alternate structure is transmitted only in the designated high-speed request slot.

21 Claims, 6 Drawing Sheets

(56) References Cited

OTHER PUBLICATIONS

D.C. Chu, "Polyphase Codes with Good Periodic Correlation Properties," IEEE Transactions on Information Theory, Jul. 1972.

Texas Instruments, Non Synchronized Random Access Performance in High Doppler Conditions, 3GPP TSG RAN WGl #47bis, R1-070257, Agenda Item: 6.5.1, Sorrento, Italy, Jan. 15-19, 2007.

Texas Instruments, Non Synchronized Random Access Design for High Doppler Conditions, 3GPP TSG RAN WGI #47, R1-063214, Agenda Item: 6.3.1, Riga, Latvia, Nov. 6-10, 2006.

Texas Instruments, Configurable Cyclic Shift for Non Synchronized Random Access preamble, Agenda Item: 6.4.3, R1-062631, 3GPP TSG RAN WG1 #46bism Seoul, Korea, Oct. 9-13, 2006.

* cited by examiner

RANDOM ACCESS DESIGN FOR HIGH DOPPLER IN WIRELESS NETWORK

CROSS-REFERENCE TO RELATED APPLICATIONS

This application is a continuation of application Ser. No. 11/925,520, filed Oct. 26, 3007, which claims priority to and incorporates by reference EP provisional application No. 06291687.9, filed on Oct. 27, 2006, and U.S. provisional application No. 60/863,500, filed on Oct. 27, 2006.

FIELD OF THE INVENTION

This invention generally relates to wireless cellular communication, and in particular to a non-synchronous request channel for use in orthogonal and single carrier frequency division multiple access (OFDMA) (SC-FDMA) systems.

BACKGROUND OF THE INVENTION

The Global System for Mobile Communications (GSM: originally from Groupe Spécial Mobile) is currently the most popular standard for mobile phones in the world and is referred to as a 2G (second generation) system. Universal Mobile Telecommunications System (UMTS) is one of the third-generation (3G) mobile phone technologies. Currently, the most common form uses W-CDMA (Wideband Code Division Multiple Access) as the underlying air interface. W-CDMA is the higher speed transmission protocol designed as a replacement for the aging 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the older TDMA (Time Division Multiple Access) signaling method of GSM networks.

Orthogonal Frequency Division Multiple Access (OFDMA) is a multi-user version of the popular Orthogonal Frequency-Division Multiplexing (OFDM) digital modulation scheme. Multiple access is achieved in OFDMA by assigning subsets of sub-carriers to individual users. This allows simultaneous low data rate transmission from several users. Based on feedback information about the channel conditions, adaptive user-to-sub-carrier assignment can be achieved. If the assignment is done sufficiently fast, this further improves the OFDM robustness to fast fading and narrow-band co-channel interference, and makes it possible to achieve even better system spectral efficiency. Different number of sub-carriers can be assigned to different users, in view to support differentiated Quality of Service (QoS), i.e. to control the data rate and error probability individually for each user. OFDMA is used in the mobility mode of IEEE 802.16 WirelessMAN Air Interface standard, commonly referred to as WiMAX. OFDMA is currently a working assumption in 3GPP Long Term Evolution (LTE) downlink. Also, OFDMA is the candidate access method for the IEEE 802.22 "Wireless Regional Area Networks".

NodeB is a term used in UMTS to denote the BTS (base transceiver station). In contrast with GSM base stations, NodeB uses WCDMA or OFDMA as air transport technology, depending on the type of network. As in all cellular systems, such as UMTS and GSM, NodeB contains radio frequency transmitter(s) and the receiver(s) used to communicate directly with the mobiles, which move freely around it. In this type of cellular networks the mobiles cannot communicate directly with each other but have to communicate with the BTSs.

Traditionally, the NodeBs have minimum functionality, and are controlled by an RNC (Radio Network Controller). However, this is changing with the emergence of High Speed Downlink Packet Access (HSDPA), where some logic (e.g. retransmission) is handled on the NodeB for lower response times and in 3GPP long term evolution (LTE) wireless networks (a.k.a. E-UTRA—Evolved Universal Terrestrial Radio Access Network) almost all the RNC functionalities have moved to the NodeB. A Node B is generally a fixed station and may be called a base transceiver system (BTS), an access point, a base station, or various other names. As the network has evolved, a NodeB is also referred to as an "evolved NodeB" (eNB).

In WCDMA and OFDMA the cells' size is not constant (a phenomenon known as "cell breathing"). This requires a careful planning in 3G (UMTS) networks. Power requirements on NodeBs and UE (user equipment) are typically lower than in GSM.

A NodeB can serve several cells, also called sectors, depending on the configuration and type of antenna. Common configuration include omni cell (360°), 3 sectors (3×120°) or 6 sectors (3 sectors 120° wide overlapping with 3 sectors of different frequency).

High-Speed Packet Access (HSPA) is a collection of mobile telephony protocols that extend and improve the performance of existing UMTS protocols. Two standards HSDPA and HSUPA have been established. High Speed Uplink Packet Access (HSUPA) is a packet-based data service of Universal Mobile Telecommunication Services (UMTS) with typical data transmission capacity of a few megabits per second, thus enabling the use of symmetric high-speed data services, such as video conferencing, between user equipment and a network infrastructure.

An uplink data transfer mechanism in the HSUPA is provided by physical HSUPA channels, such as an Enhanced Dedicated Physical Data Channel (E-DPDCH), implemented on top of the uplink physical data channels such as a Dedicated Physical Control Channel (DPCCH) and a Dedicated Physical Data Channel (DPDCH), thus sharing radio resources, such as power resources, with the uplink physical data channels. The sharing of the radio resources results in inflexibility in radio resource allocation to the physical HSUPA channels and the physical data channels.

The signals from different users within the same cell may interfere with one another. This type of interference is known as the intra-cell interference. In addition, the base station also receives the interference from the users transmitting in neighboring cells. This is known as the inter-cell interference When an orthogonal multiple access scheme such as Single-Carrier Frequency Division Multiple Access (SC-FDMA)—which includes interleaved and localized Frequency Division Multiple Access (FDMA) or Orthogonal Frequency Division Multiple Access (OFDMA)—is used; intra-cell multi-user interference is not present. This is the case for the next generation of the $3^{rd}$ generation partnership project (3GPP) enhanced-UTRA (E-UTRA) system—which employs SC-FDMA—as well as IEEE 802.16e also known as Worldwide Interoperability for Microwave Access (WiMAX)—which employs OFDMA, In this case, the fluctuation in the total interference only comes from inter-cell interference and thermal noise which tends to be slower. While fast power control can be utilized, it can be argued that its advantage is minimal.

In the uplink (UL) of OFDMA frequency division multiple access (both classic OFDMA and SC-FDMA) communication systems, it is beneficial to provide orthogonal reference signals (RS), also known as pilot signals, to enable accurate channel estimation and channel quality indicator (CQI) estimation enabling UL channel dependent scheduling, and to enable possible additional features which require channel sounding.

Channel dependent scheduling is widely known to improve throughput and spectral efficiency in a network by having the NodeB, also referred to as base station, assign an appropriate modulation and coding scheme for communications from and to a user equipment (UE), also referred to as mobile, depending on channel conditions such as the received signal-to-interference and noise ratio (SINR). In addition to channel dependent time domain scheduling, channel dependent frequency domain scheduling has been shown to provide substantial gains over purely distributed or randomly localized (frequency hopped) scheduling in OFDMA-based systems. To enable channel dependent scheduling, a corresponding CQI measurement should be provided over the bandwidth of interest. This CQI measurement may also be used for link adaptation, interference co-ordination, handover, etc.

Several control signaling information bits on downlink transmission need to be transmitted in uplink, as described in 3GPP TR 25.814 v7.0.0. 3rd Generation Partnership Project; Technical Specification Group Radio Access Network; Physical layer aspects for evolved Universal Terrestrial Radio Access (UTRA). For example, downlink hybrid Automatic Repeat reQest (ARQ) (HARQ) requires a 1-bit ACK/NACK in uplink for each received downlink transport block. Further, the downlink channel quality indicator (CQI) needs to be feedback in the uplink to support frequency selective scheduling in the downlink. When a UE (user equipment) has uplink data transmission, the downlink ACK/NACK and/or CQI can be transmitted along with the uplink data, in which the uplink reference signal can be used for coherent demodulation of the uplink data, as well as the downlink ACK/NACK and/or CQI. In case there is no uplink data transmission, a reference signal can be transmitted for coherent demodulation of the downlink ACK/NACK and/or CQI. Thus, multiple dedicated time-frequency resource blocks are necessary for the reference signal and the ACK/NACK and/or CQI. While CQI may be transmitted less frequently based on a periodic or trigged mechanism, ACK/NACK needs to be transmitted in a timely manner for every received downlink transport block to support HARQ. Note that ACK/NACK is sometimes denoted as ACKNAK or just simply ACK, or any other equivalent term.

User equipments (UEs) of an E-UTRAN network are time and frequency multiplexed on a shared channel (SCH) such that time (approximately 1 µs) and frequency synchronization are required. The scheduler, in the base-station, has full control of the time and frequency locations of uplink transmissions for all connected user devices, except for UE autonomous transmissions through either the non-synchronized random access (RA) channel or the scheduling request (SR) channel. To enable proper scheduling and multi-UE management, each UE should be uniquely identified to a base-station. The 3GPP working groups have proposed a 16-bit identifier (ID) for UE's, which represents significant overhead costs for uplink and downlink control signaling in an E-UTRAN network because, in practical implementations, at most a few hundred UE's (compared to $2^{16}$) will be maintained in uplink synchronization. An uplink synchronized UE can request and have access to uplink transmissions faster than a non-synchronized UE, which first needs to recover synchronization.

In E-UTRA, the non-synchronized random access (RA) channel is a contention-based channel multiplexed with scheduled data in a TDM/FDM manner. It is accessible during RA slots of duration $T_{RA}$ and period $T_{RA}$.

SUMMARY OF THE INVENTION

An embodiment of the present invention provides a method for transmitting in a cellular network. UE-initiated accesses within a cellular network are optimized to account for Doppler shift. A user equipment (UE) receives information that designates a particular access slot as high-speed and designates another access slot as low-speed within a given cell. The UE determines its relative speed to a serving base station (NodeB) within the cell. The UE selects either a baseline preamble structure or an alternate preamble structure if the relative speed is less than a threshold value or only an alternate preamble structure if the relative speed exceeds the threshold value. The UE transmits a preamble sequence to the NodeB using the selected preamble structure, such that the baseline preamble structure is transmitted only in the designated low-speed access slot and that the alternate preamble structure is transmitted only in the designated high-speed access slot.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Disclosed herein are various systems and methods for employing a random access channel in a wireless network to accommodate user equipment traveling at high rates of ground speed in order to overcome Doppler frequency shift effects. Embodiments of the disclosed invention may be used to access a wireless network, such as a telecommunications system, employing random access techniques. A variety of wireless networks employ random access techniques, for example the Enhanced Universal Terrestrial Radio Access Network (E-UTRAN), currently being standardized by the 3GPP working groups. The disclosed embodiments of the invention are applicable to all such networks. The disclosed embodiments include apparatus for transmitting random access signals and a method for transmitting a random access signal optimized for cellular coverage.

Embodiments of the present disclosure are directed, in general, to wireless communication systems, and can be applied to generate random access transmissions. Random access transmissions may also be referred to as ranging transmissions, or other analogous terms.

User Equipment ("UE") may be either up-link ("UL") synchronized or UL non-synchronized. That is, UE transmit timing may or may not be adjusted to align UE transmissions with Node B transmission time slots. When the UE UL has not been time synchronized, or has lost time synchronization, the UE can perform a non-synchronized random access to request allocation of up-link resources. Additionally, a UE can perform non-synchronized random access to register itself at the access point, or for numerous other reasons. Possible uses of random access transmission are many, and do not restrict the scope of the present disclosure. For example, the non-synchronized random access allows the NodeB to estimate, and if necessary, to adjust the UE's transmission timing, as well as to allocate resources for the UE's subsequent up-link transmission. Resource requests from UL non-synchronized UEs may occur for a variety of reasons, for example: new network access, data ready to transmit, or handover procedures.

Figure 1:
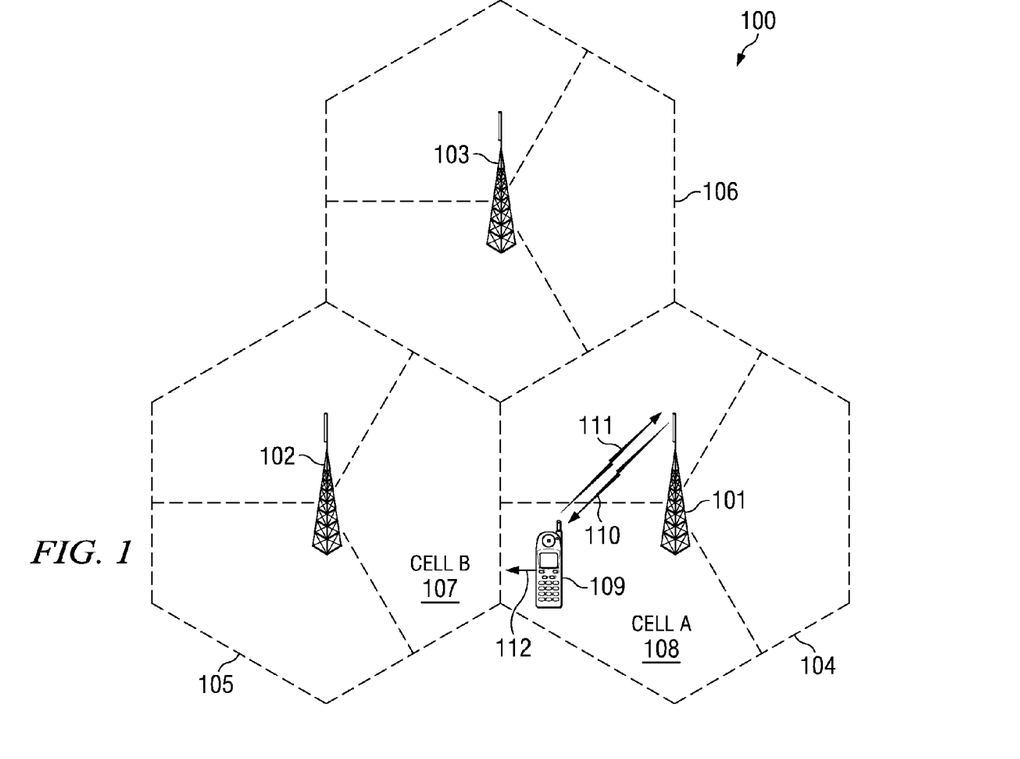
FIG. 1 is a pictorial of an illustrative telecommunications network that supports transmission of multiplexed RA preambles.

FIG. 1 shows an illustrative wireless telecommunications network 100. The illustrative telecommunications network includes base stations 101, 102, and 103, though in operation, a telecommunications network may include more base stations or fewer base stations. Each of base stations 101, 102, and 103 is operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be "handed over" to base station 102. Assuming that UE 109 is synchronized with base station 101, UE 109 likely employs non-synchronized random access to initiate handover to base station 102. The distance over which a random access signal is recognizable by base station 101 is a factor in determining cell size.

When UE 109 is not up-link synchronized with base station 101, non-synchronized UE 109 employs non-synchronous random access to request allocation of up-link 111 time or frequency or code resources. If UE 109 has data ready for transmission, for example, traffic data, measurements report, tracking area update, etc., UE 109 can transmit a random access signal on up-link 111 to base station 101. The random access signal notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 may adjust its transmit timing, to bring the UE 109 into synchronization with base station 101, and transmit the data on up-link 111 employing the allotted resources during the prescribed time interval.

Figure 2:
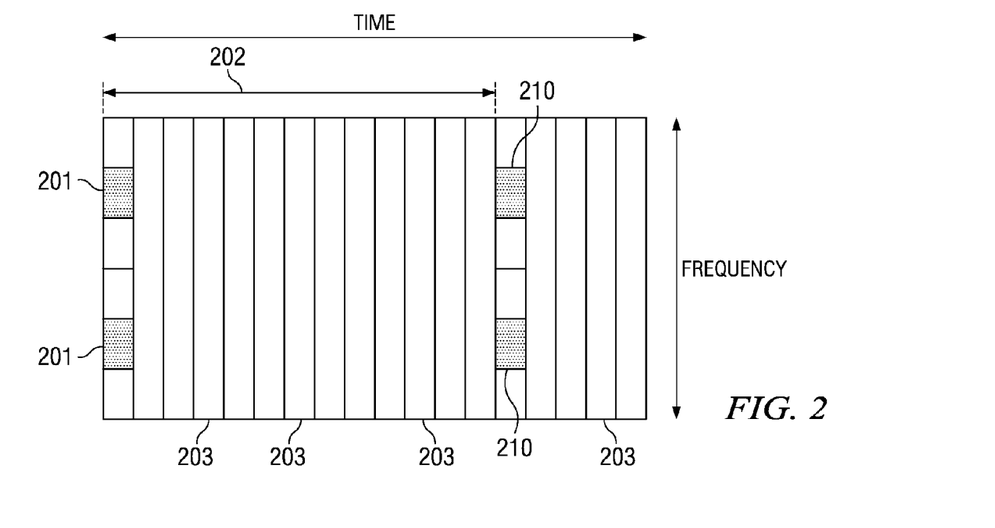
FIG. 2 is an illustrative up-link time/frequency allocation for use in the network of FIG. 1.

FIG. 2 illustrates an exemplary up-link transmission frame 202, and the allocation of the frame to scheduled and random access channels. The illustrative up-link transmission frame 202, comprises a plurality of transmission sub-frames. Sub-frames 203 are reserved for scheduled UE up-link transmissions. Interspersed among scheduled sub-frames 203, are time and frequency resources allocated to random access channels 201, 210. In the illustration of FIG. 2, a single sub-frame supports two random access channels. Note that the illustrated number and spacing of random access channels is purely a matter of convenience; a particular transmission frame implementation may allocate more or less resource to random access channels. Including multiple random access channels allows more UEs to simultaneously transmit a random access signal without collision. However, because each UE independently chooses the random access channel on which it transmits, collisions between UE random access signals may occur.

Figure 3:
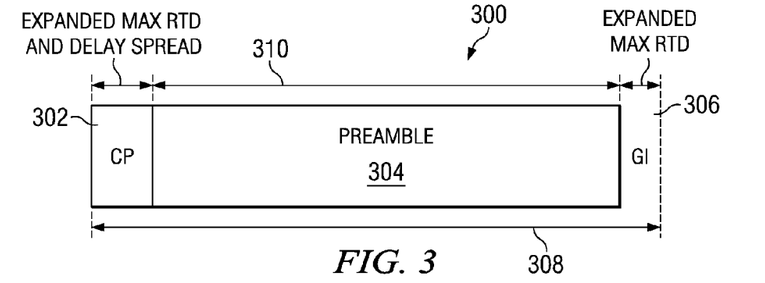
FIG. 3 illustrates a non-synchronized random access (RA) preamble structure for use in the uplink transmission of FIG. 2.

FIG. 3 illustrates a preferred embodiment of a random access signal 300. The illustrated embodiment comprises cyclic prefix 302, random access preamble 304, and guard interval 306. Random access signal 300 is one transmission time interval 308 in duration. Transmission time interval 308 may comprise one or more sub-frame 203 durations. Note that the time allowed for random access signal transmission may vary, and this variable transmission time may be referred to as transmitting over a varying number of transmission time intervals, or as transmitting during a transmission time interval that varies in duration. This disclosure applies the term "transmission time interval" to refer to the time allocated for random access signal transmission of any selected duration, and it is understood that this use of the term is equivalent to uses referring to transmission over multiple transmission time intervals. The time period allotted for random access signal transmission may also be referred to as a random access time slot.

Cyclic prefix 302 and guard interval 306 are of unequal duration. Guard interval 306 has duration equal to approximately the maximum round trip delay of the cell while cyclic prefix 302 has duration equal to approximately the sum of the maximum round trip delay of the cell and the maximum delay spread. As indicated, cyclic prefix and guard interval durations may vary from the ideal values of maximum round trip delay and maximum delay spread while effectively optimizing the random access signal to maximize coverage. All such equivalents are intended to be within the scope of the present disclosure.

Round trip delay is a function of cell size, where cell size is defined as the maximum distance d at which a UE can interact with the cell's base station. Round trip delay can be approximated using the formula $t=d*20/3$ where t and d are expressed in microseconds and kilometers respectively. The round-trip delay is the two-way radio propagation delay in free space, which can be approximated by the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 μs may be considered a conservative value thereof.

Cyclic prefix 302 serves to absorb multi-path signal energy resulting from reflections of a signal transmitted in the prior sub-frame, and to simplify and optimize equalization at the Node B 101 receiver by reducing the effect of the channel transfer function from a linear convolution to a cyclic convolution operated across the observation interval 310. Guard interval 306 follows random access preamble 304 to prevent interference between random access preamble signal 304 and any transmission in the subsequent sub-frame on the same transmission frequencies used by random access preamble signal 304.

Random access preamble signal 304 is designed to maximize the probability of preamble detection by the Node B and to minimize the probability of false preamble detections by the Node B, while maximizing the total number of resource opportunities. Embodiments of the present disclosure utilize constant amplitude zero autocorrelation ("CAZAC") sequences to generate the random access preamble signal. CAZAC sequences are complex-valued sequences with the following two properties: 1) constant amplitude (CA), and 2) zero cyclic autocorrelation (ZAC).

The preamble sequence is a long CAZAC complex sequence allocated to the UE among a set of $R_S$ possible sequences. These sequences are built from cyclic shifts of a CAZAC root sequence. If additional sequences are needed, then from cyclic shifts of other CAZAC root sequences.

Well known examples of CAZAC sequences include, but are not limited to: Chu Sequences, Frank-Zadoff Sequences, Zadoff-Chu (ZC) Sequences, and Generalized Chirp-Like (GCL) Sequences. A known set of sequences with CAZAC property is the Zadoff-Chu N-length sequences defined as follows $$a_k = \exp\left[j2\pi \frac{M}{N}\left(\frac{k(k+1)}{2} + qk\right)\right] \quad (1)$$

where M is relatively prime to N, N odd, and q any integer.

The latter constraint on N also guarantees the lowest and constant-magnitude cross-correlation $\sqrt{N}$ between N-length sequences with different values of M: $M_1$, $M_2$ such that $(M_1-M_2)$ is relatively prime to N. As a result, choosing N a prime number always guarantees this property for all values of M<N, and therefore maximizes the set of additional sequences, non orthogonal, but with optimal cross-correlation property. On top of providing additional sequences for a UE to chose among in a given cell, these sequences are also intended to be used in neighboring cells, so as to provide good inter-cell interference mitigation. In this disclosure, the terms: Zadoff-Chu, ZC, and ZC CAZAC, are used interchangeably. The term CAZAC denotes any CAZAC sequence, ZC or otherwise.

In various embodiments of the present disclosure, random access preamble signal 304 comprises a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in one embodiment of the present disclosure, a UE constructs random access preamble signal 304 by selecting a CAZAC sequence, possibly applying a combination of the described modifications to the selected CAZAC sequence, modulating the modified sequence, and transmitting the resulting random access signal over the air.

Assuming that a preamble duration allowing reliable detection at the cell perimeter has been selected, random access channel coverage is maximized by allocating as much of the transmission time interval as possible to round trip delay. In a typical embodiment of the invention, the maximum round trip delay is taken to be one half of what is left of the transmission time interval 308 after subtracting the preamble duration 304 and the maximum delay spread.

Maximum Round Trip Delay=(TTI−Preamble Duration−Delay Spread)/2

Guard interval 306 is approximately a maximum round trip delay in duration to allow for mis-timing of the random access transmission while, in the worst-case of a cell-edge UE, the tail (or delay spread) of the preamble is absorbed by the cyclic prefix of the subsequent TTI. The cyclic prefix 302 is set to a duration of approximately the sum of the maximum round trip delay and the maximum delay spread. This dimensioning of the cyclic prefix 302 and the guard interval 306 serves to maximize the cell radius over which the random access channel is effective while maintaining isolation from adjacent TTIs.

An alternative embodiment of a random access signal may assign a duration of maximum round trip delay plus maximum spread delay to both the cyclic prefix and the guard interval. This dimensioning needlessly allocates a delay spread duration to the guard interval that could otherwise be used to increase round trip delay and thereby increase cell radius.

Further aspects of embodiments of the RA channel operation are described in related U.S. patent application Ser. No. 11/691,549 filed 27 Mar. 2007, entitled "Random Access Structure For Wireless Networks" which is incorporated herein by reference; and in related U.S. patent application Ser. No. 11/833,329, filed 3 Aug. 2007, entitled "Random Access Structure For Optimal Cell Coverage" which is incorporated by reference herein.

Figure 4:
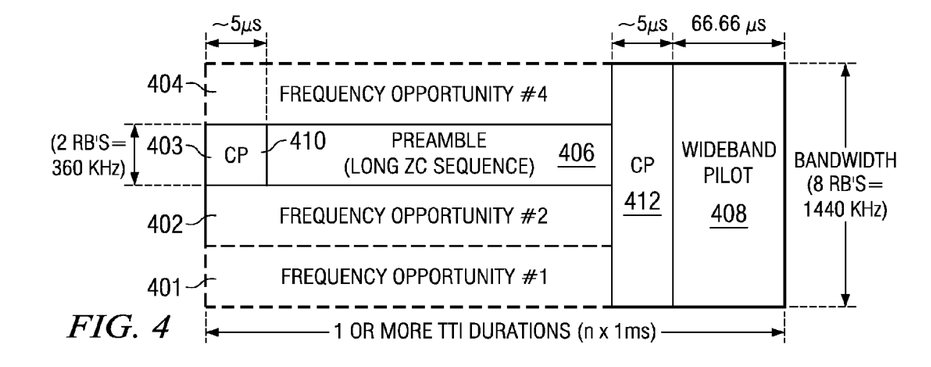
FIG. 4 illustrates a scheduling request (SR) preamble structure for use in the uplink transmission of FIG. 2.

FIG. 4 illustrates the structure of an SR slot with preamble format. It is made of four frequency blocks 401-404, which provide four orthogonal resource opportunities for transmitting a preamble. One common aspect of both the RA and SR structures is the preamble sequence: in an illustrative embodiment the preamble for the RA is a long (800 μs) CAZAC sequence and similarly the preamble sequence for the SR is a long (933.33 μs) CAZAC sequence chosen by the UE from among a set of $L_S$ possible sequences. FIG. 4 illustrates an example where a preamble 406 is transmitted in frequency opportunity #3 403. The size of each frequency block is two resource blocks (RB), which, in one embodiment corresponds to 360 kHz. Thus, the total bandwidth allocated to a SR slot is eight RB's=1.44 MHz. The preamble is followed by a wideband pilot 408 that spans the whole SR slot bandwidth, 1.44 MHz. With such a structure, a three-step procedure is used to transmit the scheduling request, where the second step is the scheduling request response from the NodeB to the UE and the third step is scheduled on the UL SCH. In one embodiment, this first post-preamble scheduled UL transmission is frequency scheduled in a localized manner within the same bandwidth as that occupied by the SR wideband pilot. Therefore, the wideband pilot 410 provides means for channel sounding to the frequency scheduler. Both preamble 406 and wideband pilot 408 have a respective cyclic prefix (CP) 410, 412 so as to guarantee the signal's orthogonality in the frequency domain while enabling a simple frequency domain detection method. The total length of CP1 410 and CP2 412 is set to approximately 5 μs, to cope with a conservative delay spread duration encountered in urban environments, for 1 ms SR slot duration, but the individual length of each depends on the system bandwidth as it is required that the wideband RS OFDM symbol be time-aligned with the last OFDM symbol in each data TTI on PUSCH. Therefore, there is no interference between the wideband RS and data.

In this embodiment, the SR slot is scheduled every 10 ms, so as to keep the average waiting time of a scheduling request to 5 ms. Further aspects of an embodiment of the SR are described in related U.S. patent application Ser. No. 11/866,912, filed 3 Oct. 2007 and entitled "An Efficient Scheduling Request Channel For Wireless Networks" and is incorporated herein by reference.

Doppler Effect

Referring again to FIG. 1, UE 109 is traveling in a direction with a ground speed as indicated by 112. The direction and ground speed results in a speed component that is relative to serving NodeB 101. Due to this relative speed of UE moving toward or away from its serving NodeB a Doppler shift occurs in the signals being transmitted from the UE to the NodeB resulting in a frequency shift and/or frequency spread that is speed dependent.

The excellent auto/cross-correlation of CAZAC sequences allows supporting a much larger number of signature opportunities, 64, than the 16 Walsh-Hadamard opportunities offered in the one version of a UMTS random access channel (RACH) preamble, and this with very little performance loss, even when two or more preambles are received in the same Random Access slot. However, the above performance assumes no or little Doppler spread or frequency shift, in presence of which, the CS-ZC sequence looses its zero-auto-correlation property. The latter degradation has been confirmed by simulations; in one such simulation the result is as follows: the wrong preamble detection rate when one or more preambles were sent rises up to 1% and 50% at 120 km/h and 360 km/h respectively, in the $E_p/N_0$ region of 18 dB, which is the RACH target SINR for detection and false alarm (in presence of noise only) probabilities of 0.99 and $10^{-2}$ respectively.

The current E-UTRA requirements regarding the performance of high-speed UE's is specified in as follows: The E-UTRAN shall support mobility across the cellular network and should be optimized for low mobile speed from 0 to 15 km/h. Higher mobile speed between 15 and 120 km/h should be supported with high performance. Mobility across the cellular network shall be maintained at speeds from 120 km/h to 350 km/h (or even up to 500 km/h depending on the frequency band). . . . The mobile speed above 250 km/h represents special case, such as high-speed train environment. In such case a special scenario applies for issues such as mobility solutions and channel models. For the physical layer parameterization E-UTRAN should be able to maintain the connection up to 350 km/h, or even up to 500 km/h depending on the frequency band.

Such requirements can be summarized as: the physical layer should be dimensioned so as to optimize the performance of low-speed UE's while keeping acceptable performance for high-speed UE's. It can be seen that with use of the preamble structures of FIG. 3 and FIG. 4 which may result in wrong preamble detection rates as high as 50% at 360 km/h, the latter requirement is not fulfilled.

Figure 5:
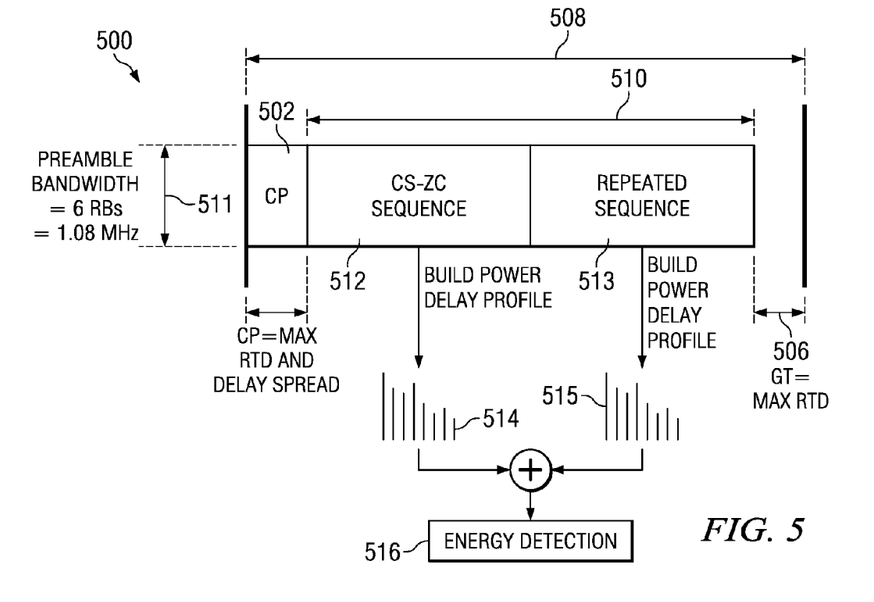
FIG. 5 illustrates an alternate preamble structure that is applicable for either an RA or SR preamble structure.

FIG. 5 illustrates an alternate preamble structure 500 for use in both RA and SR slots. Its goal is to address high-speed UE's that cannot be properly received with the baseline structure of FIG. 3 for RA slots and the baseline structure of FIG. 4 for SR slots. In the following, RA and SR alternate structures are addressed altogether. Alternate structure 500 provides acceptable performance even at 360 km/h and is depicted in FIG. 5 for the RA. This section focuses on the RA but the very same principle applies to the SR.

The illustrated embodiment comprises cyclic prefix 502, random access preamble 510, 511, and guard interval 506. Random access signal 500 is one transmission time interval 508 in duration. Transmission time interval 508 may comprise one or more sub-frame 203 durations. Note that the time allowed for random access signal transmission may vary, and this variable transmission time may be referred to as transmitting over a varying number of transmission time intervals, or as transmitting during a transmission time interval that varies in duration. In this embodiment, the RA alternate preamble has an 800 μs observation interval 510 and includes two repetitions of a 400 μs CS-ZC sequence 512 and 513. The total power delay 516 used for energy detection results from the non-coherent accumulation of the power delay profiles 514 and 515 computed from each half-preamble sequence 512, 513 respectively.

A RACH preamble has a given duration, designed to allow sufficient energy accumulation in time to allow for a proper detection probability. The RACH preamble duration is configured by an evolved NodeB (eNB) to address the worst-case propagation and interference condition possibly encountered in its cell. A typical criterion is the cell size: larger cells may configure longer preambles to account for larger propagation losses.

For a given preamble duration, the eNB can take full benefit of the "coherent" energy accumulation across the total preamble duration if this duration is smaller than the coherence time of the channel, which is the case for low-speed UE using either base preamble structure 300 of FIG. 3 or alternate preamble structure 500 of FIG. 5. For high-speed UEs, the coherence time of the channel is typically shorter than the preamble duration 310. Therefore, the coherent accumulation process needs to be shortened. In other words, the preamble duration needs to be split into N coherent accumulations, further non-coherently accumulated. The number N of "splits" is determined so that the resulting coherent accumulation durations are shortened to the coherence time of the channel. However N should be kept as small as possible to maximize the coherent accumulation durations (as close as possible to the coherence time) so as to maximize the detection performance. In the embodiment illustrated in FIG. 5 N=2.

In W-CDMA, there is a similar problem but it had no impact on the standard specification because it could be left to implementation. This is due to the fact that W-CDMA preambles use PN sequences instead of the CAZAC (Zadoff-Chu) sequences used in LTE. One nice property of the PN sequence is that its cross-correlation property is retained after being split into N chunks. Therefore, one long preamble sequence is always used by the UE, regardless of its speed, and it is up to the NodeB receiver to test multiple splits to account for a wide range of UE speeds. The CAZAC sequences have been chosen for LTE for their much higher performance and multiplexing capacity compared to PN at low-speed, but unfortunately, splitting a CAZAC sequence into N does not result in N CAZAC sequences.

Simulations have shown that the structure and detection technique illustrated in FIG. 5 allow keeping the wrong preamble detection rate when one or more preambles were sent below 1.5% at 360 km/h, which is an acceptable performance for high-speed UE's. However, structure 500 is still suboptimal for the low-speed UE, since it requires twice as many root-sequences for a given target cell radius compared to baseline structure 300, see Table 1. As a result the probability to receive two or more different root ZC sequences in the same RA slot increases for the alternate structure, which degrades the performance.

TABLE 1

Number of mother sequences required to generate 64 signatures for the baseline and alternate structure

| Sequence length (μs) | # of cyclic shifts per ZC seq. | # of ZC sequences | Cyclic shift (samples) | Max cell radius from cyclic shift (km) |
|---|---|---|---|---|
| 800 | 64 | 1 | 13 | 0.78 |
|  | 32 | 2 | 26 | 2.59 |
|  | 16 | 4 | 53 | 6.34 |
|  | 8 | 8 | 107 | 13.85 |
| 400 | 32 | 2 | 13 | 0.78 |
|  | 16 | 4 | 26 | 2.59 |
|  | 8 | 8 | 53 | 6.35 |
|  | 4 | 16 | 107 | 13.87 |

Multiplexing of the Two RA Structures

This embodiment now utilizes the two different RA structures 300, 500. Baseline structure 300 is optimized for low-speed UE's. Alternate structure 500 allows addressing high-speed UE's. Both carry the same information and their usage is transparent for upper layers. This section addresses how to use and multiplex the two structures.

First, it is assumed that base structure 300 provides good enough performance (e.g. wrong preamble detection rate <1%) up to a certain UE speed, say $V_{max}$=120 km/h. As a result, for those cells where the UE speed is not expected to exceed this upper bound, only baseline structure 300 is used. This is signaled by the NodeB as part of system and cell-specific information on the broadcast channel (BCH) that is received by each UE within a given cell. It can be assumed this would apply to a wide range of cells, for example, indoors cells, pico-cells, downtown cells as well as some sub-urban cells.

For those cells where high-speed UE's are expected, the NodeB configures both structures and broadcast this information to all UE in the cell. In one embodiment, the structures are multiplexed in the time domain. For example, assuming the RA slot period is $T_{RA}$, Structure 300 and Structure 500 are scheduled subsequently. Referring again to FIG. 2, RA slot 201 may be designated for slow-speed UE and the next sequential RA slot 210 is designated for high-speed UE, and so on in an alternating fashion.

In another embodiment, a cell that is configured to support high-speed UE requires all UE within the cell to use the alternate structure for accesses. Likewise, a cell that is configured not to support high-speed UE requires all UE within the cell to use the baseline structure for accesses. Multiplexing will not be performed in such an embodiment; instead all request slots will be designated as high-speed access slots in a cell configured to support high-speed UE.

Typically, the decision to configure a cell to support high-speed UE is controlled by a network manager based on knowledge of the physical movement of UE within the geographical limits of the cell. For example, if a given cell such as cell B 107 of FIG. 1 serves only a neighborhood with residential streets, there is little possibility for high-speed UE. Similarly if cell A 108 contains a highway, then it will always need to support high speed UE. As physical conditions change within the cell, high-speed UE may become an issue at a later date; in this case, the network manager can update the configuration of the cell to allow it to support high-speed UE. For example, the highway may be extended from cell A into the area of cell B. Therefore, the determination of which cells support high-speed UE can be made based on geographical constraints of the cell and will remain static for long periods of time.

In this embodiment, the low-speed UE can access all RA slots, but its performance will be sub-optimal every other RA slot. In this case, a low-speed UE will transmit a base preamble structure 300 during a designated low-speed RA slot 201, but will transmit alternate preamble structure 500 during a designated high-speed slot 210.

The high-speed UE can only access the RA slots where Structure 500 is scheduled, such as slot 210. As a result, high-speed UE's can now use the RA, but with some additional latency compared to low-speed UE's.

Each UE estimates its own speed based on correlation measurements performed on a downlink (DL) pilot broadcasted by the NodeB. Note this only needs to be a rough estimation since the UE needs to choose among two options only: speed<$V_{max}$ or speed>$V_{max}$ Structure 300 is used by low-speed UE's during designated low-speed slots 201, for which, if the RA receiver at the eNB implements only one coherent accumulation over the total preamble duration, the optimal performance is preserved. However, alternate structure 500 is used by both low-speed and high-speed UE during designated high-speed slot 210. The CAZAC sequence optimized cross-correlation property is not retained with two CAZAC sequences of different lengths. As a result, high-speed and low-speed structures cannot coexist in the same slot, because in case two UEs would access that slot with different structures, they would highly interfere with each other. During designated high-speed slot 210, since the RA receiver cannot know a-priori whether the UE is a high or low-speed UE, it implements both accumulation schemes in parallel bins before selection or soft combining them. For accumulation scheme one, non-coherent accumulation of the power delay profiles 514, 515 resulting from each sequence accumulation is performed. This accumulation scheme allows addressing high-speed UE's. Accumulation scheme two performs one coherent accumulation over the total preamble duration of alternate preamble structure 500. Thanks to the long coherence time of its channel, the eNB can process the low-speed UE's repeated sequence with a single coherent accumulation, thus this accumulation scheme retains the optimum performance for low-speed UE's. Both accumulation schemes deliver a power delay profile. Both power delay profiles are compared against a detection threshold and the UE's preamble is detected if its sample position in either accumulation power delay profile exceeds the detection threshold.

Figure 6:
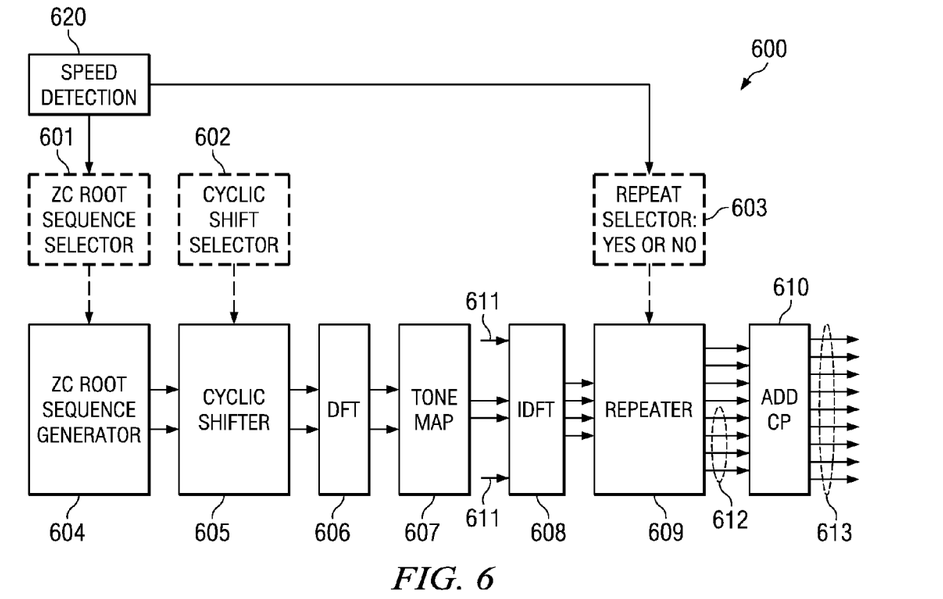
FIG. 6 is a block diagram of an illustrative transmitter for transmitting the preamble structures of FIGS. 3-5.

FIG. 6 is a block diagram of an illustrative transmitter for transmitting the preamble structures of FIGS. 3-5. Apparatus 600 comprises ZC Root Sequence Selector 601, Cyclic Shift Selector 602, Repeat Selector 603, ZC Root Sequence Generator 604, Cyclic Shifter 605, DFT in 606, Tone Map 607, other signals or zero-padding in 611, IDFT in 608, Repeater in 609, optional repeated samples 612, Add CP in 610, and the schedule request signal in 613. Elements of the apparatus may be implemented as components in a fixed or programmable processor. In some embodiments, the IDFT block in 608 may be implemented using an Inverse Fast Fourier Transform (IFFT), and the DFT block in 606 may be implemented using a Fast Fourier Transform (FFT). Apparatus 600 is used to select and perform the schedule request preamble signal transmission as follows. The UE performs selection of the CAZAC (e.g. ZC) root sequence using the ZC Root Sequence Selector 601 and the selection of the cyclic shift value using the Cyclic Shift Selector 602. Next, UE generates the CAZAC (e.g. ZC) sequence using the ZC Root Sequence Selector 604. Then, if necessary, the UE performs cyclic shifting of the selected CAZAC (e.g. ZC) sequence using the Cyclic Shifter 605. The UE performs DFT (Discrete Fourier Transform) of the cyclically shifted CAZAC (e.g. ZC) sequence in DFT 606. The result of the DFT operation is mapped onto designated set of tones (sub-carriers) using the Tone Map 607. Additional signals or zero-padding 611, may or may not be present. The UE next performs IDFT of the mapped signal using the IDFT 608. The size of the IDFT in 608 may optionally be larger than the size of DFT in 606.

Speed detection circuit 620 estimates the UE speed relative to the NodeB based on correlation measurements performed on a downlink (DL) pilot broadcasted by the NodeB. Note this only needs to be a rough estimation since the UE needs to choose among two options only: speed<$V_{max}$ or speed>$V_{max}$. If the speed exceeds $V_{max}$ then the UE may only transmits an alternate preamble structure 500 during a designated high-speed RA slot 210. If the speed is less than $V_{max}$, then the UE may transmit a base preamble structure 300 during a low-speed RA slot 201 or transmit an alternate preamble structure 500 during a high-speed slot 210. If the UE is transmitting during a high-speed RA slot, then a shortened CAZAC sequence is selected by selector 601. Block-Repetition of the IDFT-ed signal is then performed using repeater 609. A cyclic prefix (CP) can be added using 610, to arrive at the random access or schedule request signal 613. The random access or schedule request signal 613 is transmitted over the air. If the UE is transmitting during a low-speed RA slot, then a long CAZAC sequence is selected by selector 601 and no repetition is performed by repeater 609.

In other embodiments, the order of cyclic shifter 605, DFT 606, tone map 607 and IDFT 608 may be arranged in various combinations. For example, in one embodiment a DFT operation is performed on a selected root sequence, tone mapping is then performed, an IDFT is performed on the mapped tones and then the cyclic shift may be performed. In another embodiment, tone mapping is performed on the root sequence and then an IDFT is performed on the mapped tones and then a cyclic shift is performed.

Figure 7:
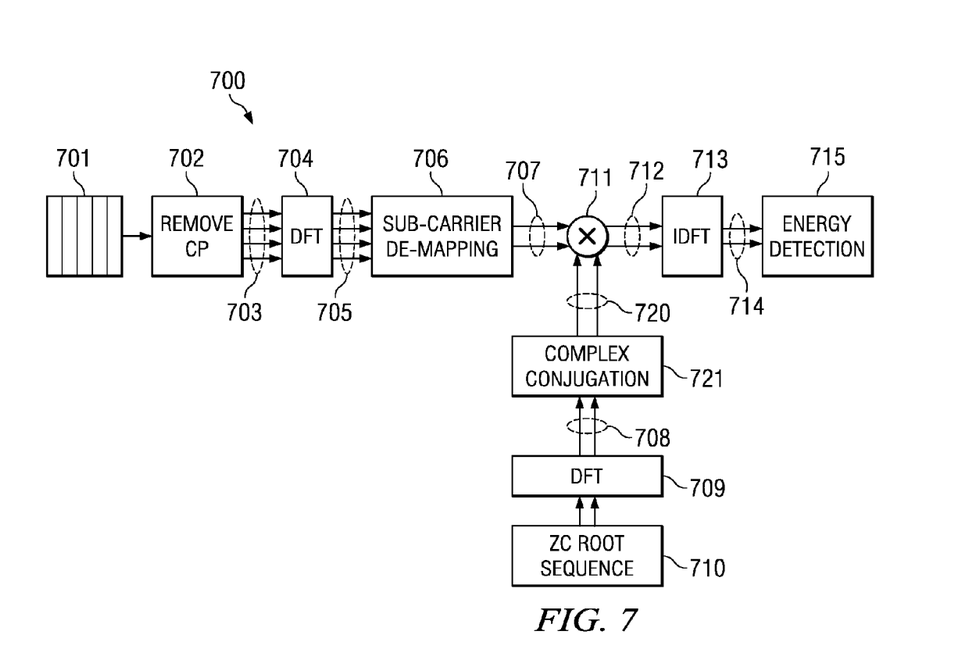
FIG. 7 is a block diagram of an illustrative receiver for receiving the preamble structures of FIGS. 3-5.

FIG. 7 is a block diagram of an illustrative receiver for receiving the preamble structures of FIGS. 3-5. This receiver advantageously makes use of the time and frequency domain transforming components used to map and de-map data blocks in the up-link sub-frame. The received schedule request signal 701, comprising cyclic prefix and schedule request preamble signal, is input to cyclic prefix removal component 702 which strips the cyclic prefix from the schedule request signal producing signal 703. Frequency domain transforming component DFT 704 couples to cyclic prefix removal component 702. Frequency domain transforming component 704 converts signal 703 into sub-carrier mapped frequency tones 705. Sub-carrier de-mapping component 706 is coupled to frequency domain transforming component 704. Sub-carrier de-mapping component 706 de-maps sub-carrier mapped frequency tones 705 to produce useful frequency tones 707. Product component 711 is coupled to both sub-carrier de-mapping component 707 and frequency domain transforming component 709. Frequency domain transforming component (DFT) 709 converts a preamble root sequence 710, such as a prime length Zadoff-Chu sequence, into a corresponding set of pilot frequency tones 708. Complex conjugation of pilot frequency tones 708 is performed using 721, to produce samples 720. Product component 711 computes a tone by tone complex multiplication of received frequency tones 707 with samples 720 to produce a set of frequency tones 712. Time domain transforming component (IDFT) 713 is coupled to product component 711. Time domain transforming component 713 converts multiplied frequency tones 712 into correlated time signal 714. Correlated time signal 714 contains concatenated power delay profiles of the cyclic shift replicas of the preamble root sequence 710.

Energy detection block 715 is coupled to time domain transforming block 713. Energy detection block 715 identifies received preamble sequences by detecting the time of peak correlation between received schedule request signal 701 and preamble root sequence 710. During a low-speed RA (or SR) slot, energy detection block 715 processes a base preamble structure 300 by performing one coherent accumulation over the total preamble duration of the low-speed preamble structure.

During a high-speed RA (or SR) slot, energy detection block 715 processes an alternate structure 500 by implementing two accumulation schemes in parallel bins before selection or soft combining them during a high-speed slot:

accumulation scheme 1: non-coherent accumulation of the power delay profiles resulting from each repeated sequence accumulation of the high-speed preamble structure 500, (see FIG. 5). This accumulation scheme allows addressing high-speed UE's.

accumulation scheme 2: same as the baseline structure: one coherent accumulation over the total preamble duration of the high-speed preamble structure 500. This accumulation scheme retains the optimum performance for low-speed UE's.

Figure 8:
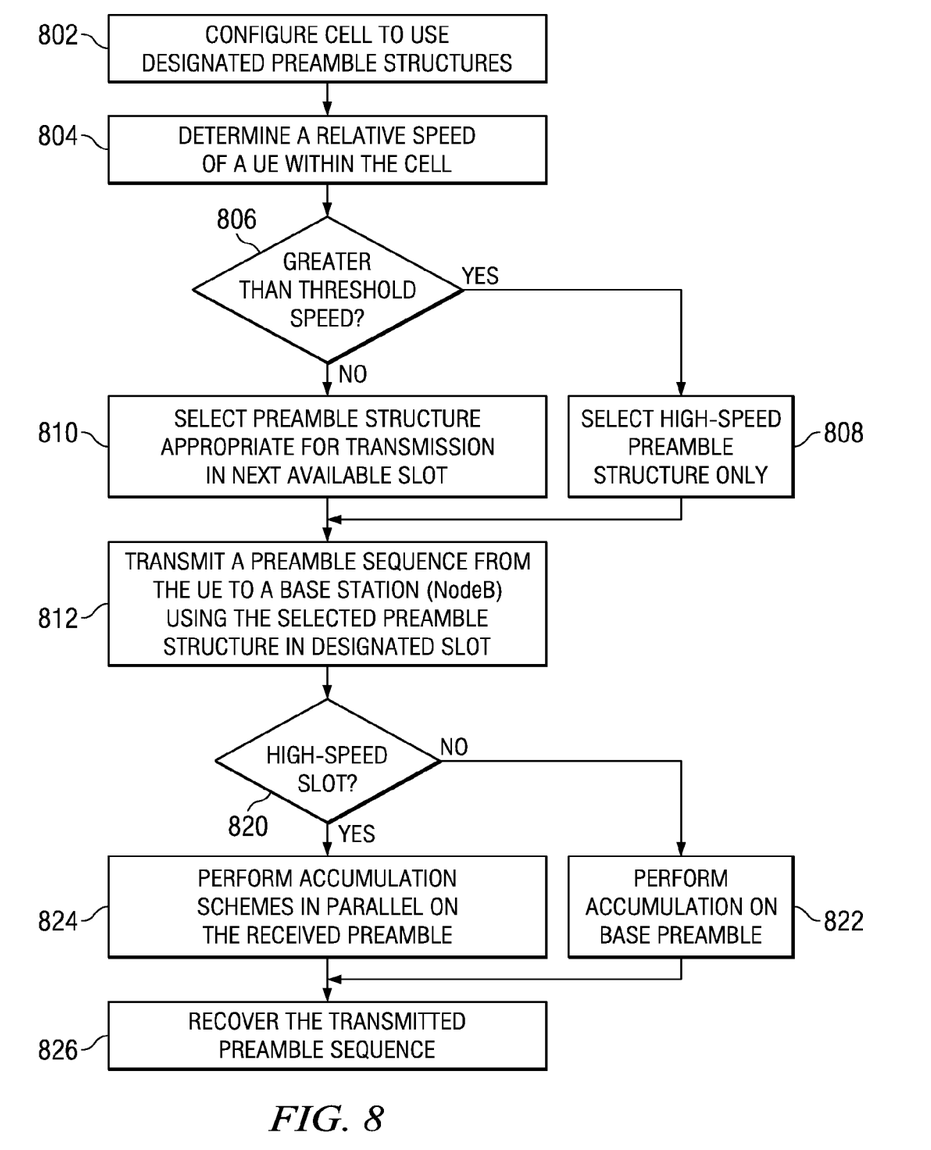
FIG. 8 is a flow diagram illustrating transmission of multiplexed preamble structures.

Note that frequency domain transforming component 709 is called for when using the transmitters illustrated in FIG. 8. When using an alternative embodiment transmitter that does not perform a DFT, frequency domain transforming component 709 may be omitted.

FIG. 8 is a flow chart illustrating transmission of a multiplexed RA or SR structure. The use of the baseline structures only or both the baseline and the alternate structures is configured 802 by the Node B on a cell basis, depending on expected relative speeds of UE within the cell. For cells where UE's are not expected to exceed the upper bound of the speed range tolerated by the baseline structures 300 of FIG. 3 only baseline structures are used. For cells where UE's are expected to exceed the upper bound of the speed range tolerated by the aforementioned structures, then alternate structures 500 are added. For each cell, a determination is made if that given cell will support high-speed UE based on geographical constraints of the cell. A database, file, or other storage scheme is updated to retain the determination for each cell in a portion of a network. A network manager responsible for the portion of the network controls the database. The network manager then conveys the determination for each given cell to a NodeB that serves the given cell. The information can be conveyed by wireless transmission, wired network transmission or other means as appropriate.

The baseline preamble structure defines a single preamble sequence that is a cyclic shifted CAZAC sequence and the alternate preamble structure defines a preamble sequence that is a shortened version of the cyclic shifted CAZAC sequence that is repeated one or more times The alternate structure is identical to the baseline structure except that the preamble sequence is built by repeating a sequence in which the duration is half of the preamble duration. UE within the cell are informed as to which slots may be used by both high-speed and low-speed UEs and which slots may be used by low-speed UE only. When both baseline and alternate structures are used in a cell, they are multiplexed in the time domain: the Node B schedules 802 subsequently the baseline and alternate structures. Low-speed UE's can access all RA slots. High-speed UE's can only access the RA slots where the alternate structure is scheduled. As a result, high-speed UE's can now use the RA, but with some additional latency compared to low-speed UE's.

Each UE determines 804 its own speed based on correlation measurements performed on the DL pilot broadcasted by the NodeB. Note this only needs to be a rough estimation since the UE needs to choose among 2 options only: speed<$V_{max}$ or speed>$V_{max}$ If the speed exceeds $V_{max}$ 805 then the UE may only select 808 an alternate preamble structure 500 for transmission during a designated high-speed RA slot 210. If the speed is less than $V_{max}$, then the UE may select 810 a base preamble structure 300 for transmission during a low-speed RA slot 201 or an alternate preamble structure 500 for transmission during a high-speed slot 210.

A selected preamble sequence is then transmitted 812 from the UE to a base station (NodeB) using the selected preamble structure in the correct designated RA slot. Base preamble structures may only be transmitted in designated low-speed slots and alternate preamble structures may only be transmitted in designated high-speed slots.

An RA receiver at the Node B receives and processes the alternate structures. If 820 a high-speed slot is not being processed, one coherent accumulation is performed 822 over the entire preamble duration. If 820 a high-speed slot is being processed, two accumulation schemes are performed 824 in parallel bins before selection or soft combining them. Accumulation scheme 1 is non-coherent accumulation of the power delay profiles resulting from each sequence 512, 513. This accumulation scheme allows addressing high-speed UE's. Accumulation scheme 2 is the same as the baseline structure and performs one coherent accumulation over the total preamble duration 510. This accumulation scheme retains the optimum performance for low-speed UE's. Both accumulation schemes deliver a power delay profile. Both power delay profiles are compared against a detection threshold and the UE's preamble is detected 826 if its sample position in either accumulation power delay profile exceeds the detection threshold.

In an another embodiment that does not support multiplexed access requests, a cell that is configured to support high-speed UE requires all UE within the cell to use the alternate structure for accesses. In such an embodiment, only the alternate structure is configured 802 for use in a given cell that supports high-speed UE. The NodeB transmits the cell configuration to all UE within the cell. In this embodiment, speed detection 804, 806 is not performed by the UE. Instead, the UE selects 810 a baseline structure for a request if the given cell is configured to support only low-speed UE or selects 810 the alternate structure for accesses if the given cell is configured to support high-speed UE.

Figure 9:
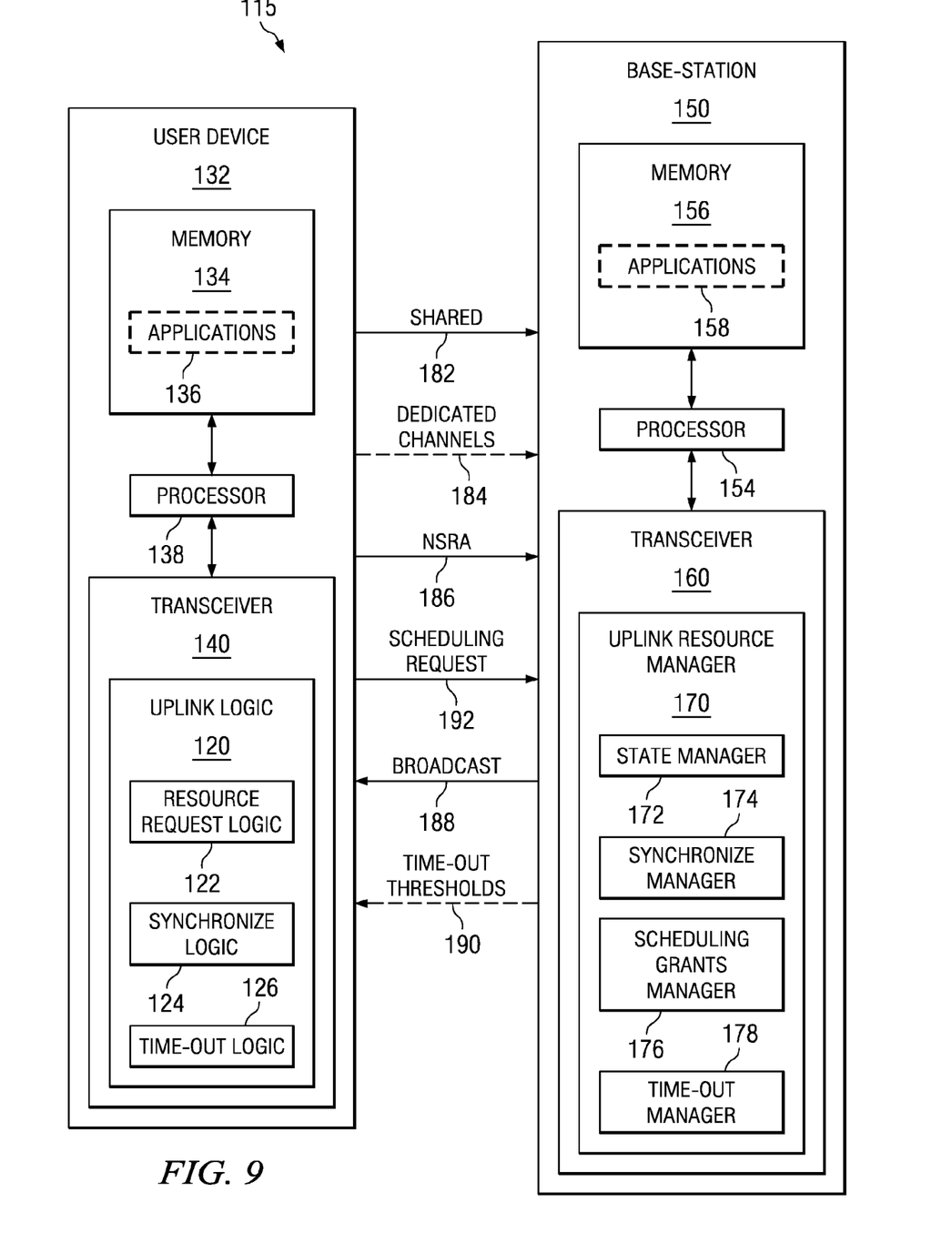
FIG. 9 is a block diagram illustrating the network system of FIG. 1.

FIG. 9 is a block diagram illustrating the network system of FIG. 1. As shown in FIG. 9, the wireless networking system 115 comprises a user device 132 in communication with a base-station 150. The user device 132 may represent any of a variety of devices such as a server, a desktop computer, a laptop computer, a cellular phone, a Personal Digital Assistant (PDA), a smart phone or other electronic devices. In some embodiments, the electronic device 132 communicates with the base-station 150 based on a LTE or E-UTRAN protocol. Alternatively, another communication protocol now known or later developed is used.

As shown, the electronic device 132 comprises a processor 138 coupled to a memory 134 and a transceiver 140. The memory 134 stores applications 136 for execution by the processor 138. The applications 136 could comprise any known or future application useful for individuals or organizations. As an example, such applications 136 could be categorized as operating systems, device drivers, databases, multimedia tools, presentation tools, Internet browsers, emailers, Voice Over Internet Protocol (VoIP) tools, file browsers, firewalls, instant messaging, finance tools, games, word processors or other categories. Regardless of the exact nature of the applications 136, at least some of the applications 136 may direct the user device 132 to transmit uplink signals to the base-station 150 periodically or continuously via the transceiver 140. Over time, different uplink transmissions from the user device 132 may be high priority (time-critical) or low priority (non-time critical). In at least some embodiments, the user device 132 identifies a Quality of Service (QoS) requirement when requesting an uplink resource from the base-station 150. In some cases, the QoS requirement may be implicitly derived by the base-station 150 from the type of traffic supported by the user device 132. As an example, VoIP and gaming applications often involve high priority uplink transmissions while High Throughput (HTP)/Hypertext Transmission Protocol (HTTP) traffic involves low priority uplink transmissions.

As shown in FIG. 9, the transceiver 140 comprises uplink logic 120, which enables the user device 132 to request an uplink resource from the base-station 150 and upon a successful request to send uplink transmissions to the base-station 150. In FIG. 9, the uplink logic 120 comprises resource request logic 122, synchronize logic 124, and time-out logic 126. As would be understood by one of skill in the art, the components of the uplink logic 120 may involve the physical (PHY) layer and/or the Media Access Control (MAC) layer of the transceiver 140.

In at least some embodiments, the resource request logic 122 detects when the user device 132, in absence of any valid uplink resource grant, needs to send an uplink transmission to the base-station 150 and submits a corresponding scheduling request. If the user device 132 is not uplink synchronized, the scheduling request is made using non-synchronized random access (RA) 186, which is potentially contentious depending on how many other user devices also need to use the RA at the same time (e.g., for scheduling requests or uplink synchronization maintenance). Alternatively, if the user device 132 is uplink synchronized, the resource request may be submitted via a contention-free scheduling request channel 192 which may be available to the user device 132. In either case, the request is made using either preamble structure 300 or 500, depending on the relative speed of the UE to the NodeB and how a particular cell is configured, as described earlier. A command received from the base station indicates if multiplexed preamble transmissions are supported for high-speed operation in a given cell, as described in more detail above. If supported, transceiver 140 estimates speed based on correlation measurements performed on a downlink (DL) pilot broadcasted by the NodeB. Note this only needs to be a rough estimation since the UE needs to choose among two options only: speed<$V_{max}$ or speed>$V_{max}$ In at least some embodiments, the scheduling request channel 192 is part of the dedicated channels 184. The dedicated channels 184 represent uplink synchronized channels which are dedicated to a particular purpose and which are selectively accessible to one or more user devices. Another example of dedicated channel is the sounding reference signal (SRS). The SRS is a standalone reference signal (or pilot) which provides means to the base-station to perform channel quality information (CQI) estimation for frequency dependent scheduling, to maintain uplink synchronization, and to implement link adaptation and power control for each user.

If the user device 132 previously obtained a resource allocation from the base station 150 and the resource allocation has not expired, uplink transmissions can be sent via a shared channel 182 (i.e., a channel shared with other user devices based on time and division multiplexing) in the form of a MAC Packet Data Unit (PDU) transmission. In at least some embodiments, the resource request logic 122 also detects when the user device 132, with at least one valid uplink resource grant, needs to update its current allocated uplink resource(s) (e.g., if the user device 132 needs more resources because it received more data in its transmission buffer) and submits a corresponding scheduling request. Since the user device 132 already has valid uplink grants, it is uplink synchronized, and the resource request may be either embedded in a MAC PDU sent on these valid grants on the uplink shared channel 182, or submitted via the scheduling request channel 192.

To use the shared channel 182 or the scheduling request channel 192, the user device 132 receives a unique identifier from the base-station 150. In some embodiments, the unique identifier is explicitly provided by the base-station 150 (e.g., the base-station 150 broadcasts a multi-bit unique identifier to the user device 132 for use with the shared channel 182). In alternative embodiments, the unique identifier is implicitly provided by the base-station 150 (e.g., the base-station 150 provides a one-to-one mapping between the user device 132 and a physical uplink resource of the scheduling request channel 192).

The synchronize logic 124 enables the user device 132 to maintain a particular synchronization for uplink transmissions via the shared channel 182 or other uplink synchronized channels (e.g., the SRS or the scheduling request channel 192). In some embodiments, the synchronize logic 124 supports time and frequency adjustments based on a predetermined protocol and/or instructions from the base-station 150. Once the user device 132 is synchronized, the synchronization can be periodically updated based on timers and/or information exchanged between the user device 132 and the base-station 150. For example, if the user device 132 is synchronized and has at least one scheduling grant from the base-station 150, then the synchronize manager 174 of the base-station 150 can maintain the user device's synchronization based on ongoing uplink transmissions from the user device 132 via the shared channel 182.

If the user device 132 is synchronized but does not have a scheduling grant from the base-station 150, then the synchronize manager 174 of the base-station 150 can maintain the user's synchronization based on an RA transmission 186. Alternatively, if the user device 132 is synchronized but does not have a scheduling grant from the base-station 150, then the synchronize manager 174 of the base-station 150 can maintain the user's synchronization based on information transmitted via one of the dedicated channels 184 (e.g., using a SRS or an autonomous synchronization request from the user device 132 through the scheduling request channel 192). By appropriately synchronizing uplink transmissions of the user device 132, interference to and from the transmissions of other user devices can be avoided and orthogonal multiplexing is maintained.

As shown in FIG. 9, the base-station 150 comprises a processor 154 coupled to a memory 156 and a transceiver 170. The memory 156 stores applications 158 for execution by the processor 154. The applications 158 could comprise any known or future application useful for managing wireless communications. At least some of the applications 158 may direct the base-station to manage transmissions to or from the user device 132.

As shown in FIG. 9, the transceiver 160 comprises an uplink resource manager 170, which enables the base-station 150 to selectively allocate uplink resources to the user device 132. In FIG. 9, the uplink resource manager 170 comprises a state manager 172, a synchronize manager 174, a scheduling grants manager 176 and a time-out manager 178. As would be understood by one of skill in the art, the components of the uplink resource manager 170 may involve the physical (PHY) layer and/or the Media Access Control (MAC) layer of the transceiver 160.

Transceiver 160 includes a receiver as described in more detail in FIG. 7. As discussed previously, a management application on the NodeB determines if the particular cell managed by the NodeB will support the high-speed preamble structure 500 of FIG. 5. If so, the NodeB broadcasts this information to all UE in the cell as part of system and cell-specific information on a broadcast channel (BCH). An energy detection block within the receiver processes the alternate received structures by implementing two accumulation schemes in parallel bins before selection or soft combining them, as described above.

In at least some embodiments, the state manager 172 determines whether to assign the user device 132 to a synchronized state or to a non-synchronized state. In at least some embodiments, the user device 132 can request to be assigned to the synchronized state using RA 186.

If the user device 132 is accepted into the synchronized state, a reduced identifier is provided to the user device 132. The reduced identifier enables the user device 132 to send uplink transmissions via the shared channel 182 and new resource requests via the scheduling requests channel 192. In some embodiments, the state manager 172 enables the reduced identifier to be explicitly provided to the user device 132 (e.g., broadcasting a multi-bit unique identifier to the user device 132 for use with the shared channel 182). In alternative embodiments, the state manager 172 enables the unique identifier to be implicitly provided to the user device 132 (e.g., providing a one-to-one mapping between the user device 132 and a physical uplink resource of the base-station 150). If the user device 132 becomes non-synchronized due to a time-out or any other reason, the state manager 172 reassigns the user device 132 to the non-synchronized state and releases the reduced identifier and any associated uplink resource that was assigned to the user device 132.

The synchronize manager 174 maintains user devices in synchronization for uplink transmissions via the shared channel 182 or any dedicated channel 184. In order to do so, the synchronize manager 174 estimates the timing error of the uplink transmissions of the user device 132 on either the shared channel 182, a dedicated channel 184 (e.g., SRS) or the RA 186. Then, the synchronize manager 174 sends back a timing advance (TA) command to the user device 132, that will be executed by the synchronize logic 124. By appropriately synchronizing uplink transmissions of the user device 132, the synchronize manager 174 avoids interferences between uplink transmissions of the user device 132 and uplink transmissions of other user devices and orthogonal multiplexing is maintained.

The scheduling grants manager 176 selectively determines when synchronized user devices will be scheduled on the shared channel 182. For example, the scheduling grants manager 176 may assign scheduling grants in response to new resource requests from user device 132 sent through the scheduling request channel 192.

If more than a threshold amount of time passes during which the user device 132 does not send any uplink transmissions, a time-out may occur. The time-out manager 178 determines when a time-out occurs based on one or more time-out thresholds 190. In at least some embodiments, the time-out manager 178 implements timers or counters to track the amount of time that passes between uplink transmissions for all synchronized user devices. The time-out thresholds 190 may be predetermined or may be determined, for example, based on the number of user devices in communication with the base-station.

In at least some embodiments, a time-out threshold causes user devices to enter the non-synchronized state. Typically, the entrance of user devices to the non-synchronized state does not depend on exchanging messages between the base station 150 and user devices. In other words, both user devices and the base-station 150 can track the passage of time separately and independently determine that a user device is in a non-synchronized state. In case a user device transitions to the non-synchronized state, any existing uplink grant of this user device is released.

Figure 10:
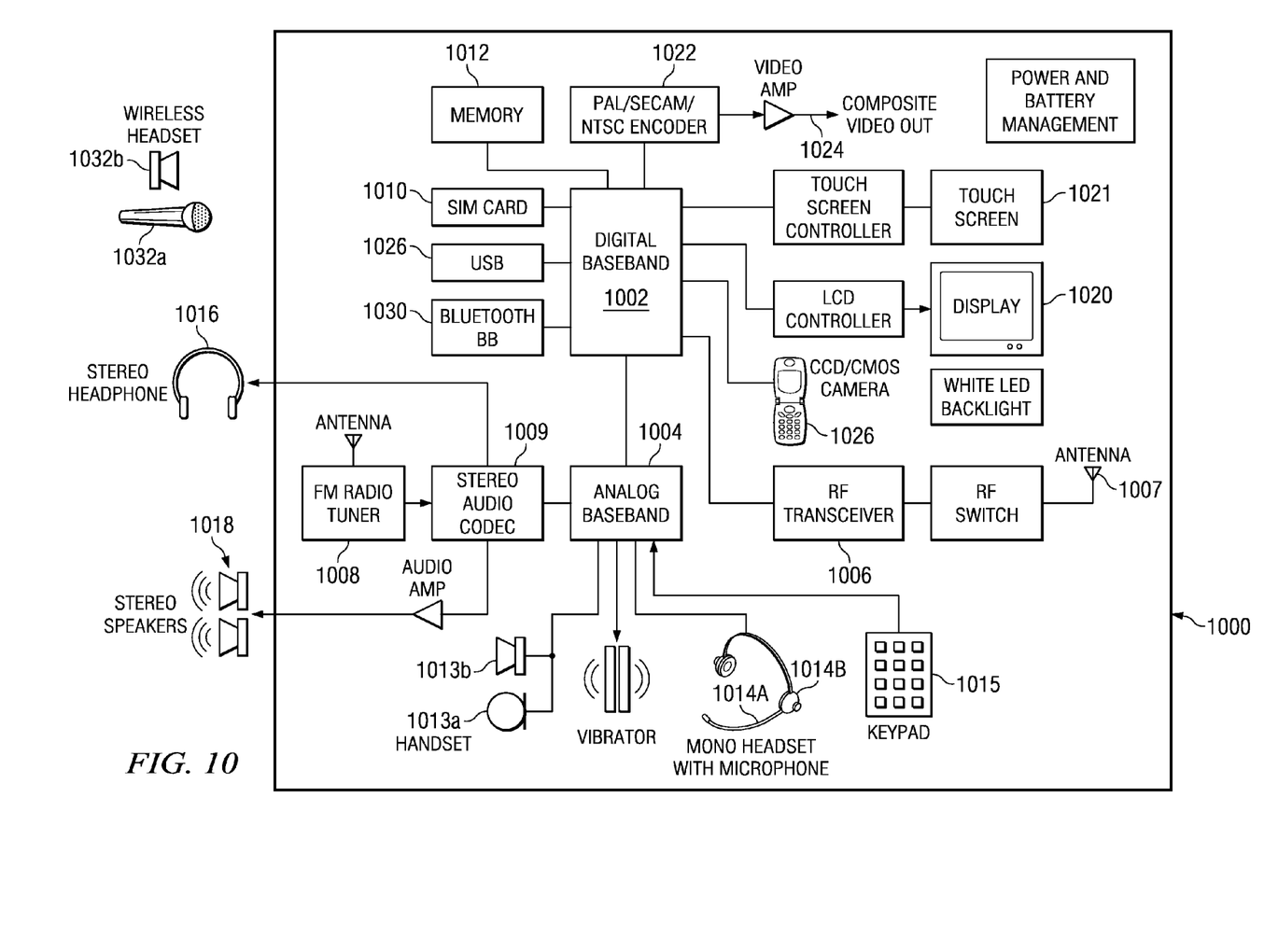
FIG. 10 is a block diagram of a cellular phone for use in the network of FIG. 1.

FIG. 10 is a block diagram of a UE 1000 that uses preamble multiplexing to allow high ground speed operation when performing RA and SR transmissions comprising a cyclic shifted preamble, as described above. Digital system 1000 is a representative cell phone that is used by a mobile user. Digital baseband (DBB) unit 1002 is a digital processing processor system that includes embedded memory and security features.

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013*a* and sends a voice data stream to handset mono speaker 1013*b*. ABB 1004 also receives a voice data stream from microphone 1014*a* and sends a voice data stream to mono headset 1014*b*. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same processor that performs DBB processing. In another embodiment, a separate DSP or other type of processor performs ABB processing.

RF transceiver 1006 includes a receiver for receiving a stream of coded data frames and commands from a cellular base station via antenna 1007 and a transmitter for transmitting a stream of coded data frames to the cellular base station via antenna 1007. A command received from the base station indicates if multiplexed preamble transmissions are supported for high-speed operation in a given cell, as described in more detail above. If supported, transceiver 1006 estimates speed based on correlation measurements performed on a downlink (DL) pilot broadcasted by the NodeB. Note this only needs to be a rough estimation since the UE needs to choose among two options only: speed<$V_{max}$ or speed>$V_{max}$.

A scheduling request signal is transmitted using multiplexed preamble structures when supported by a given cell when data is ready for transmission as described above; in response, scheduling commands are received from the serving base station. Among the scheduling commands can be a command (implicit or explicit) to use a particular sub-channel for transmission that has been selected by the serving NodeB. Transmission of the scheduled resource blocks are performed by the transceiver using the sub-channel designated by the serving NodeB. Frequency hopping may be implied by using two or more sub-channels as commanded by the serving NodeB. In this embodiment, a single transceiver supports OFDMA and SC-FDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic SC-FDMA DSP radio can include DFT, subcarrier mapping, and IFFT (fast implementation of IDFT) to form a data stream for transmission and DFT, subcarrier de-mapping and IFFT to recover a data stream from a received signal, as described in more detail in FIGS. 6-7. DFT, IFFT and subcarrier mapping/de-mapping may be performed by instructions stored in memory 1012 and executed by DBB 1002 in response to signals received by transceiver 1006.

DBB unit 1002 may send or receive data to various devices connected to USB (universal serial bus) port 1026. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032*a* and headset 1032*b* for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1026.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description.

Embodiments of this invention apply to any flavor of frequency division multiplex based transmission. Thus, the concept of valid specification of sub-channels can easily be applied to: OFDMA, OFDM, DFT-spread OFDM, DFT-spread OFDMA, SC-OFDM, SC-OFDMA, MC-CDMA, and all other FDM-based transmission strategies.

A Node B is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

In a general embodiment of the present disclosure, the set of allowed schedule request preamble signals is defined by two other sets: 1) a set of allowed root CAZAC sequences, and 2) a set of allowed modifications to a given root CAZAC sequence. In one embodiment, schedule request preamble signal is constructed from a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in various embodiments of the present disclosure, a UE constructs a schedule request preamble signal by selecting a CAZAC sequence, possibly applying a combination of the described modifications to the selected CAZAC sequence, modulating the modified sequence, and transmitting the resulting schedule request signal over the air.

While embodiments described herein relate to the use of preamble structures for request slots, other embodiment may use other structures in other slots besides requests slots provided there is a baseline structure for low-speed and an alternate structure for high-speed, the former being exclusively used by low-speed UEs and the latter being jointly used by both high-speed and low-speed UEs. The generic idea is always the same: prioritize low-speed UEs with respect to high-speed UEs, for which the system is "less" optimized. Therefore the low-speed structure can be only be used by low-speed UEs and the high-speed structure can be used by both low-speed UEs and high-speed UEs.

It is therefore contemplated that the appended claims will cover any such modifications of the embodiments as fall within the true scope and spirit of the invention.

What is claimed is:

1. A method for transmitting in a cellular network, comprising:
   receiving information by a user equipment (UE) within a given cell that designates a particular access slot as either a high-speed access slot or a low-speed access slot; and
   transmitting a signal from the UE to a NodeB using a selected structure, such that a baseline structure is transmitted only in the designated low-speed access slot and that an alternate structure is transmitted only in the designated high-speed access slot, wherein transmitting by UE is permitted in both the high-speed access slot and in the low-speed access slot if the relative speed is less than a threshold value, and wherein transmitting by the UE is permitted only in the high-speed access slot if the relative speed exceeds the threshold value.

2. The method of claim 1 where both the baseline structure and the alternate structure each comprise a preamble.

3. The method of claim 2, wherein a baseline preamble structure defines a single preamble sequence that is a cyclic shifted constant amplitude zero autocorrelation (CAZAC) sequence and an alternate preamble structure defines a preamble sequence that is a shortened version of the cyclic shifted CAZAC sequence that is repeated one or more times.

4. The method of claim 2, wherein a plurality of slots are for non-synchronized random access (RA) requests and a different plurality of slots are for scheduling requests (SR).

5. The method of claim 1, further comprising receiving a command from the NodeB that authorizes the UE to use an alternate preamble structure, wherein the alternate preamble structure is not selected if not authorized.

6. The method of claim 1, further comprising:
   determining a relative speed of the UE to a serving base station within the cell.

7. The method of claim 6, wherein the UE determines the relative speed based on correlation measurements performed on a downlink (DL) pilot broadcast by the NodeB.

8. The method of claim 7, further comprising:
   receiving a selected preamble structure at the NodeB;
   performing two accumulation schemes in parallel on a received preamble structure during a high-speed request slot, wherein the first accumulation scheme performs one coherent accumulation of power delay profiles over a total preamble duration, and wherein the second accumulation sequence performs non-coherent accumulation of power delay profiles resulting from each repeated preamble sequence; and
   recovering a transmitted preamble sequence from one of the two accumulation schemes if a sample position in either accumulation power delay profile exceeds a detection threshold.

9. A user equipment (UE) for use in a cellular network, comprising:
   means for receiving information by the UE within a given cell that designates a particular access slot as either a high-speed access slot and or a low-speed access slot;
   means for selecting either a baseline structure or an alternate structure;
   means for transmitting a signal from the UE to a NodeB using the selected structure, such that the baseline structure is transmitted only in the designated low-speed access slot and that the alternate structure is transmitted only in the designated high-speed access slot;
   means for determining a relative speed of the UE to a serving base station within the cell; and
   means for selecting either the baseline structure or the alternate structure if the relative speed is less than a threshold value or only the alternate structure if the relative speed exceeds the threshold value.

10. The UE of claim 9 where both baseline and alternate structures each comprise a preamble.

11. The UE of claim 9, further comprising means for permitting transmission in both the high-speed access slot and in the low-speed access slot if the relative speed is less than the threshold value; and
   means for permitting transmission by the UE only in the high-speed access slot if the relative speed exceeds the threshold value.

12. A cellular telephone for use in a cellular network, comprising:
   a receiver connected to an antenna operable to receive information within a given cell that designates a particular access slot as either a high-speed access slot or a low-speed access slot;
   a processor connected to a storage memory holding instructions for execution by the processor and connected to obtain signals from the receiver, wherein the processor is operable to select either a baseline structure or an alternate structure, wherein the processor is operable to determine a relative speed of the UE to a serving base station within the cell; and wherein the processor is operable to select either a baseline structure or an alternate structure if the relative speed is less than a threshold value or only an alternate structure if the relative speed exceeds the threshold value; and
   a transmitter connected to the processor operable to transmit a signal from the cellular telephone to a NodeB using the selected structure, such that the baseline structure is transmitted only in the designated low-speed access slot and that the alternate structure is transmitted only in the designated high-speed access slot.

13. The cellular telephone of claim 12 where both baseline and alternate structures each comprise a preamble.

14. The cellular telephone of claim 13, wherein the processor is further operable to form a baseline preamble structure that is a single preamble sequence by selecting a constant amplitude zero autocorrelation (CAZAC) sequence and then cyclic shifting the CAZAC sequence a determined amount and further operable to form an alternate preamble structure by selecting a shortened CAZAC sequence, cyclic shifting the shortened CAZAC sequence and then repeating the cyclic shifted shortened CAZAC sequence one or more times.

15. The cellular telephone of claim 14, wherein the processor determines the relative speed based on correlation measurements performed on a downlink (DL) pilot broadcast to the receiver by the NodeB.

16. A method for transmitting in a cellular network, comprising:
transmitting information to UE within a given cell that designates a particular access slot as either a high-speed access slot or a low-speed access slot;
receiving a signal at a serving base station of the given cell from the UE using a selected structure, such that a baseline structure is received only in the designated low-speed access slot and that an alternate structure is received only in the designated high-speed access slot;
determining if each given cell will support high-speed UE based on geographical constraints of the cell;
compiling a database to retain the determination for each cell in a portion of the a network; and
transmitting the determination for each given cell to a NodeB that serves the given cell.

17. The method of claim 16 wherein all access slots for a given NodeB are designated as either low-speed access slots or high-speed access slots.

18. The method of claim 16, wherein both the baseline structure and the alternate structure each comprise a preamble.

19. The method of claim 18 wherein a baseline preamble structure defines a single preamble sequence that is a cyclic shifted constant amplitude zero autocorrelation (CAZAC) sequence and an alternate preamble structure defines a preamble sequence that is a shortened version of the cyclic shifted CAZAC sequence that is repeated one or more times.

20. The method of claim 18, further comprising:
performing two accumulation schemes in parallel on a received preamble structure during a high-speed slot, wherein the first accumulation scheme performs one coherent accumulation of power delay profiles over a total preamble duration, and wherein the second accumulation sequence performs non-coherent accumulation of power delay profiles resulting from each repeated preamble sequence; and
recovering the transmitted preamble sequence from one of the two accumulation schemes if a sample position in either accumulation power delay profile exceeds a detection threshold.

21. The method of claim 16 wherein a plurality of slots are for non-synchronized random access (RA) requests and a different plurality of slots are for scheduling requests (SR).

* * * * *